US008326976B2

(12) United States Patent
Proulx et al.

(10) Patent No.: US 8,326,976 B2
(45) Date of Patent: Dec. 4, 2012

(54) CONFIGURING APPLICATION MANAGEMENT REPORTING IN A COMMUNICATION NETWORK

(75) Inventors: Denis Armand Proulx, Ottawa (CA); Glenn Michael Chenier, Kanata (CA)

(73) Assignee: Alcatel Lucent, Paris (FR)

( * ) Notice: Subject to any disclaimer, the term of this patent is extended or adjusted under 35 U.S.C. 154(b) by 620 days.

(21) Appl. No.: 12/495,346

(22) Filed: Jun. 30, 2009

(65) Prior Publication Data

US 2010/0332649 A1    Dec. 30, 2010

(51) Int. Cl.
*G06F 15/173*    (2006.01)
(52) U.S. Cl. ...................................................... 709/224
(58) Field of Classification Search ............ 709/224–227
See application file for complete search history.

(56) References Cited

U.S. PATENT DOCUMENTS

| | | | | |
|---|---|---|---|---|
| 6,662,221 | B1* | 12/2003 | Gonda et al. | 709/223 |
| 7,352,853 | B1* | 4/2008 | Shen et al. | 379/201.12 |
| 7,447,151 | B2* | 11/2008 | McDysan | 370/231 |
| 8,139,598 | B2* | 3/2012 | Holmstrom et al. | 370/443 |
| 2003/0120773 | A1* | 6/2003 | Mueller et al. | 709/224 |

OTHER PUBLICATIONS

Technical Committee on Sensor Technology (TC-9), "IEEE Standard for a Precision Clock Synchronization Protocol for Networked Measurement and Control Systems", IEEE Std 1588, NYNY 2008.

* cited by examiner

*Primary Examiner* — Chirag R Patel
(74) *Attorney, Agent, or Firm* — Kramer & Amado P.C.

(57) ABSTRACT

The invention is directed to configuring an application management reporting service for managing a networked application carried over a WAN service without requiring knowledge of a network operator's infrastructure that is providing the WAN service. This capability aims at providing an abstraction from both the architecture of the operator's network and the technical details of its QoS management.

18 Claims, 3 Drawing Sheets

CONFIGURING APPLICATION MANAGEMENT REPORTING IN A COMMUNICATION NETWORK

FIELD OF THE INVENTION

The invention is directed to packet switching networks (PSN), particularly to configuring reporting services thereon for managing traffic on an application specific basis, herein referred to as application management reporting.

BACKGROUND OF THE INVENTION

The current pace of technological evolution presents the typical enterprise Information Technology (IT) organization with many opportunities and many challenges. On one hand, the availability of cost-effective, feature-rich, secure site-to-site wide area network (WAN) services provides enhanced capability to expand regionally, streamline operations, and take advantage of globalization opportunities. On the other hand, the increasing business reliance on these technologies creates a growing mandate for a practical solution to manage this new business asset.

Over the past quarter century technological innovations have so permeated the enterprise that, regardless of the size of organization, effectively all major business processes are fundamentally underpinned by business-critical networked applications. Additionally, highly affordable WAN services such as virtual private network (VPN) services including Virtual Leased Line (VLL), Virtual Private LAN Service (VPLS) and IP VPN (Virtual Private Routed Network (VPRN)), have created an environment where even modest sized businesses can comfortably afford to connect discrete office locations and reap the operational benefits of centralizing business-critical networked applications over these reliable and secure connections.

While technologies to enable operators to offer affordable WAN services have evolved rapidly, techniques to manage them have not kept pace. Consider that most enterprises have little or no control over the performance of business applications provided over their WANs. These networked applications are often critically important to an enterprise; hence the impact of poor application performance can be substantial and often translates into lost business and/or higher operational costs.

Historically, application management solutions have been to deploy WAN management appliances at each site within a WAN—either by the enterprise themselves, independent of the operator, or through the operator as a managed service. The capital cost of these appliances, combined with the increased operational cost to manage them, effectively restricts this solution to all but the largest enterprises.

Although prioritization of networked application traffic can be a powerful management tool to an enterprise IT department, its implementation requires an understanding of the network operator's infrastructure, routes, paths, quality of service (QoS) management and queuing. However, in many cases a network operator may not want to share the details of its network with its enterprise customers.

Therefore, it would be desirable to have a cost-effective way for an enterprise to manage performance of its networked applications in a manner that does not require detailed knowledge of a network operator's infrastructure.

SUMMARY OF THE INVENTION

Embodiments of the invention enable an enterprise to configure an application management reporting service for a networked application carried over a WAN service without requiring knowledge of a network operator's infrastructure that is providing the WAN service. This capability aims at providing an abstraction from both the architecture of the operator's network and the technical details of its QoS management.

An embodiment of the invention provides a simplified management view relating behavior and treatment of an application to a service level of service level agreement (SLA) that is in place between an enterprise and a network operator. By relating an application to a service level, this capability aims at enabling the enterprise to verify proper treatment of traffic belonging to critical applications, and make appropriate adjustments to such treatment when necessary, without a massive outlay of capital. The enterprise is able to do this without delving into complexities of the network operator's underlying infrastructure.

According to an aspect of the invention there is provided a method of configuring an application management reporting service for a networked application provided over a packet switching network. The method comprises the steps of: receiving input identifying said application and a customer of said application; and executing automatically instructions stored on a computer readable media, the instructions when executed causing a sequence of steps to be performed, the sequence comprising the steps of: determining, from the input, a service access point to be affected by configuration of said service; determining a router of the packet switching network that is configured with said service access point; configuring the router with an application filter corresponding to said application and said service access point; and configuring a reporting entity to retrieve statistics collected by the application filter related to said application.

According to an aspect of the invention there is provided a system for configuring an application management reporting service for a networked application provided over a packet switching network. The system comprises a service application stored thereon; means for communicatively coupling to a management entity of the packet switching network via an operations support system interface; and a service database for storing information related to said application and a customer of the application. The service application comprises instructions stored on computer readable media to be executed by the system to cause a sequence of actions to be performed in cooperation with the management entity, the actions comprising: receiving input identifying said application and the customer of said application; determining, from the input, a service access point to be affected by configuration of said service; determining a router of the packet switching network that is configured with said service access point; configuring the router with an application filter corresponding to said application and said service access point; and configuring a reporting entity to retrieve statistics collected by the application filter related to said application.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
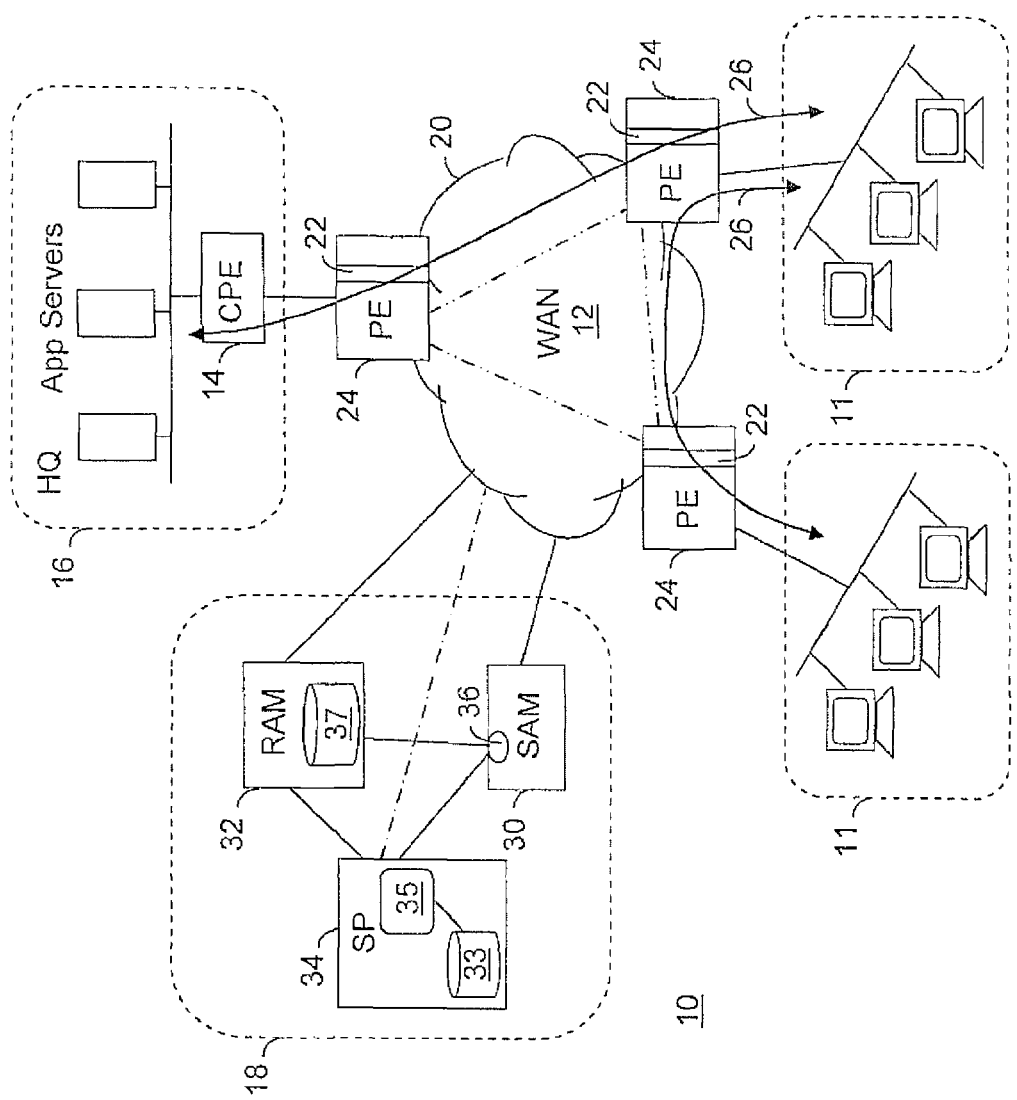
FIG. 1 illustrates a network configuration including a system for configuring an application management reporting service according to a first embodiment of the invention.

Referring to FIG. 1, a hybrid approach 10 incorporates aspects of a CPE-based solution and a network-based solution to provide a unified solution. A network-based approach is used to provide cost-effective management for a majority of sites 11 on an enterprise WAN 12, and a highly functional CPE appliance 14 delivers compression and acceleration to a high-demand site, such as a data center 16. A unified management infrastructure means that regardless of how traffic is being managed (network or CPE) an enterprise IT department leverages a single management system 18. This approach provides complete abstraction from the complexities of the operator's network 20 as well as implementation of WAN management at a given site (CPE or network).

An application assurance integrated services adapter (AA-ISA) card 22 is provided in application aware provider edge routers 24 (AA-routers). Real-time deep packet inspection (DPI) capability on OSI Layers 3 to 7, provided by the AA-ISA card 22, allows the application-aware routers 24 to dynamically identify and intelligently meter traffic flows 26 of applications based on their underlying protocols.

Network and service management of these application aware routers 24 is provided by a management entity referred to herein as a service aware manager (SAM) 30. A reporting entity referred to herein as a reporting and analysis manager (RAM) 32 provides a query and analysis capability with regard to the traffic flows 26. Both the SAM 30 and the RAM 32 can also be used to enable an enterprise customer service portal (SP) 34 to provide seamless integration between various network, service, and policy management applications.

An inventory report of applications identified on the enterprise WAN 12 is generated by the RAM 32 and delivered to enterprise customers through the SP 34. This capability provides the enterprise with clear visibility of what applications are running on their WAN 12, and flags newly-identified applications. This in turn enables the enterprise to proactively make decisions, and corresponding application management configurations changes, regarding how those newly identified applications will be treated on their WAN 12—thus helping to prevent future performance and service issues.

As previously discussed, the hybrid approach 10 enables the operator's enterprise customer to maximize the use of the WAN 12 through application identification and application performance optimization. Understanding what applications are using the WAN 12 gives the enterprise an opportunity to reduce and otherwise manage traffic associated with non-business applications Reducing non-business-related traffic helps to ensure that the business value of the WAN 12 is realized. Application performance optimization is another capability of the hybrid approach 10 that enhances the business value of the WAN 12. Application performance optimization allows business-critical enterprise applications to behave properly even when the WAN 12 is in a congested state. Enabling prioritization of critical applications allows the enterprise to operate using less of the WAN 12 capacity than would otherwise be required, which can lead to WAN service cost savings.

The SAM 30 is a single management platform offering element, network and service management for advanced application-aware Layer 2 and Layer 3 network solutions and services based on the application aware routers 24. The SAM 30 is an integrated element, network and service manager, all in one platform. Ease of service management is achieved by the SAM 30 via sophisticated service modeling. For example, Layer 2 and Layer 3 services are modeled in an integrated way so that operational workflows related to these services are common and differ only where needed. There is no need to have separate management systems for each type of service. The SAM 30 has a network-wide view of all network and service objects and the linkages between them. Layers 1, 2 and 3 and their relationships are all modeled. Hence the effect of changes or problems in any one level on the other levels can be made immediately apparent to an operator via a SAM 30 user interface. The SAM 30 user interface displays these effects in real time with alarms, statuses, icon color changes, topology maps and more. This holistic network modeling allows the SAM 30 to automate certain functions, which significantly simplifies the workload on the operations staff.

Effectively optimizing the use of the WAN 12 to maximize the business value generated from that resource begins by understanding which applications, intended or otherwise, are running over the WAN 12. Leveraging the RAM 32, the hybrid approach 10 provides an integrated capability to understand what applications are present and the overall impact those applications are having on the network.

The AA-ISA card 22 enables the application aware router 24 to provide stateful application traffic flow inspection for Layer 2 and Layer 3 VPN services. Statistical data resulting from the flow inspection is stored on the AA-ISA cards 22. The RAM 32 accesses this data via the SAM 30, and generates a report that gives the enterprise an immediate awareness of applications running on the WAN 12 over a given inspection period.

The RAM 32 also supports long-term data analysis by generating WAN 12 usage trend reports that span months or even years. This visibility into overall WAN 12 usage over time can be extrapolated into the future to predict when additional capacity will likely be required. The RAM 32 enables network-wide application-aware visibility and planning insight for application-aware business VPN networks. The RAM 32 provides a scalable, application-centric query and analysis capability that supports the enterprise's management of their WAN 12 usage as well as internal operations of the network operator.

The RAM 32 further provides data warehousing and aggregation services. Raw data is provided by the AA-ISA cards 22 within the routers 24, through a statistics collection infrastructure of the SAM 30. The RAM 32 collects the statistics from the SAM 30 on a periodic basis. The RAM 32 then relates the data to contextual information available via an operations support system (OSS) Interface (SAM-O) 36 of the SAM 30. The contextual information includes information such as enterprise identity and service access point (SAPs) configuration information, and stores the results along with the data in a database 37 on the RAM 32.

Corporate functions are often grouped by location—that is, Site 1 might be the corporate headquarters with primary responsibility for business and marketing; Site 2 might be an R&D location with responsibilities for product development and support; Sites 3 to 25 might be regional sales centers. Given that the activities and functions of these sites are dramatically different, it is reasonable that the traffic coming from, and going to, those sites would be notably different as well. Analyzing the traffic on a site-by-site basis will produce a better result, as the functions of each site can be a contributing factor to whether or not specific applications create business value.

Much of the value of the hybrid approach 10 is accessed by the enterprise through the SP 34. Access to reporting, application management and the optimization capability are all provided through the SP 34, which can be specifically tailored to meet the unique requirements of the operator and its enterprise customers.

The SP 34 is a web-based application that provides custom network management functionality to the operator and/or to its enterprise IT customers. The portal provides simplified user interfaces for network management tasks—streamlining operations within the operator's organization and abstracting the enterprise customer from the details of the operator's network. The service portal can deliver highly differentiated views to users, allowing the same service portal system to provide direct benefit to both the enterprise customer and the operator.

The SP 34, via the SAM 30, allows the enterprise to define the priority of specific applications in alignment with a service level agreement (SLA) that it has with the network operator providing the WAN 12. The simplified application assignment (for example, VoIP assigned to Gold Service, FTP assigned to Bronze Service) translates directly into application quality of service policies (AQPs) that determine how the AA-ISA card 22 enabled application aware routers 24 will re-mark the QoS fields of data packets belonging to traffic flows of that application type. This re-marking of the QoS parameters in data packets will have the desired effect of promoting the expedient delivery of critical application traffic, as defined by the priority assignment given to the applications.

The SP 34 delivers network management capability through integration with the SAM 30 using the SAM-O interface 36. This structure also supports the hybrid approach 10 in which most customer sites 11 are supported through a network-based approach but some larger customer sites 16 are supported by a CPE device 14. In most cases, AQPs on those CPE devices (even third party) can be pushed by the SAM 30, which is seamless to the SP 34. In instances where a third-party CPE device requires a separate element management system (EMS), that system can also be integrated into the SP 34. The end result for the enterprise customer is that they need not be concerned with how or where an application is being managed. The enterprise's interface for application management is the SP 34, which remains consistent and simplified; hence reducing the enterprise's overall cost managing their networked applications.

The SP 34 provides highly customizable access to a selection of reports predefined by the operator and generated by the RAM 32. The SP 34 integrates with the RAM 32 through the Organization for the Advancement of Structured Information Standards (OASIS) Web Services for Remote Portlet (WSRP) standard. In this manner, the SP 34 is able to pass specific information about the customer and the site or VPN of interest to the RAM 34, and the RAM 34 can dynamically inject report content directly into the SP 34. Any reports within the RAM 34 (standard or custom developed by the network operator) are available for SP 34 integration.

Further using the SAM-O interface 36 the SP 34 can issue control commands to the SAM 30 including commands to effect provisioning changes at the provider edge routers 24. The SP 34 would typically be a computer system such as a laptop or desktop computer or workstation. The SAM-O interface 36 is an Extensible Markup Language (XML) interface; although other types of message interfaces could be used.

The SP 34 executes a service application 35 that is in communication with a service database 33 on the SP 34, although all or parts of the service database 33 could also reside on the SAM 30 with access to it given by the SAM-O interface 36. The service application 35 is a software program that embodies a method of configuring an application management reporting service in accordance with an embodiment of the invention. The service database 33 includes information on customer IDs, service instances (Service IDs), SAPs, QoS policies, AQPs, application policies, and application filters that are used by the method, as will be explained later with reference to FIG. 2 and FIG. 3.

Figure 2:
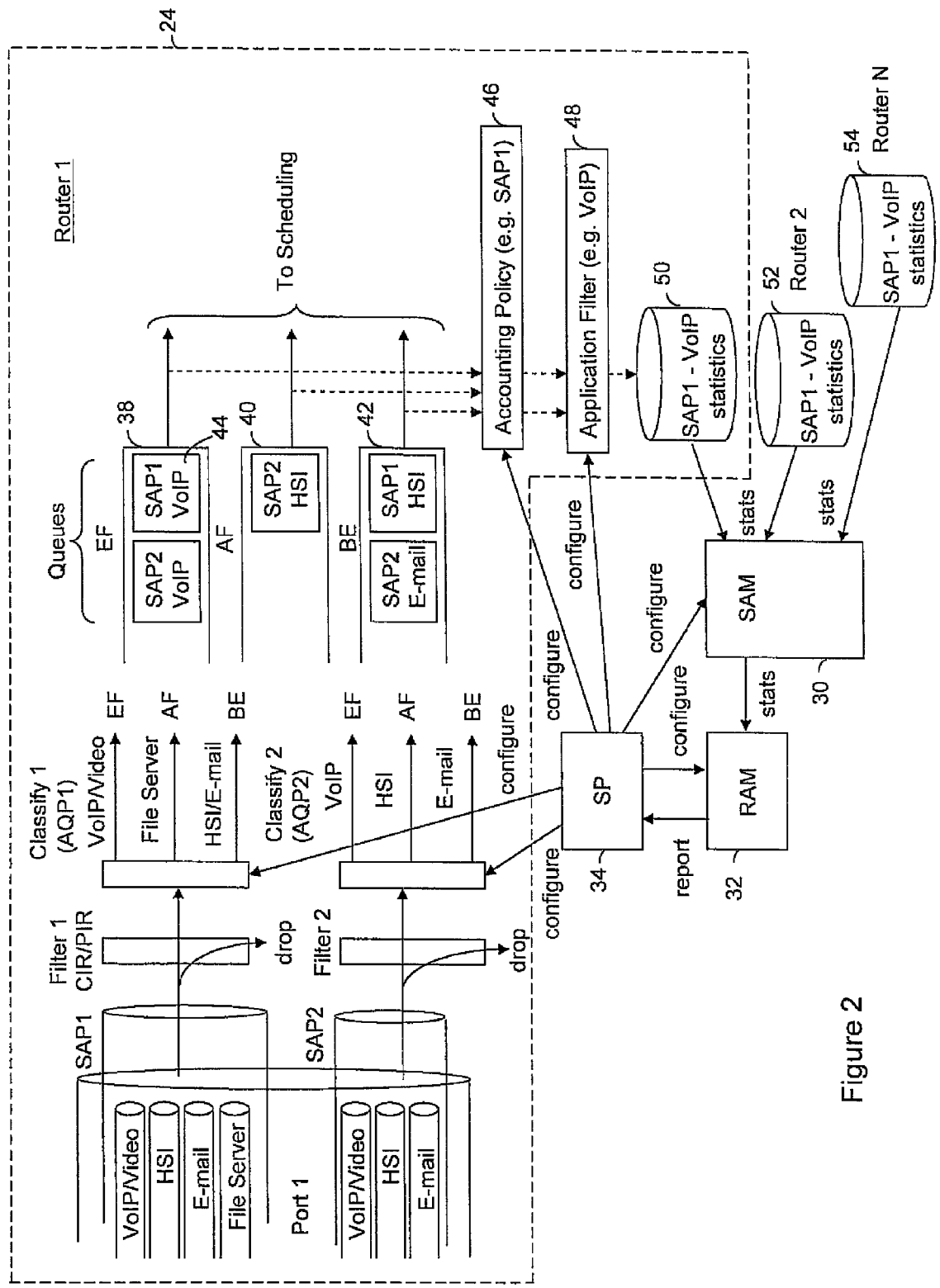
FIG. 2 illustrates operation of the network configuration and system of FIG. 1 in greater detail.

Referring to FIG. 2, operation of the network configuration and system of FIG. 1 will now be described in greater detail. A first application aware provider edge router, router 1, includes a first port, port 1, on which first and second service access points (SAPS) SAP1, SAP2 are configured. A SAP provisioned on a router is used to associate a service instance with a port of the router and a policy. The first service access point SAP1 is configured for four types of application traffic from the WAN 12, they are: VoIP/Video, high speed Internet (HIS), e-mail, and File Server traffic. The second service access point SAP2 is configured for three types of application traffic, they are: VoIP/Video, HSI, and e-mail. The application traffic associated with the first SAP belongs to a given instance of a service type e.g. VPLS, VLL, and VPRN, which is identified by a service identifier (Service ID) and belongs to a given customer who is identified by a customer identifier (Customer ID). Likewise, the application traffic associated with the second SAP belongs to another service instance.

Virtual Private LAN Service (VPLS) is an Ethernet service that effectively implements closed user groups via VPLS instantiations. In order to achieve full isolation between the user groups, VPLS dedicates a separate database, usually in the form of a forwarding information base (FIB), on network routers per VPLS instance. Each VPLS instance further requires that a dedicated mesh of pseudowire tunnels is provisioned between PE routers that are part of the VPLS.

Both VLL and VPLS services use SAPs to bind tunnel endpoints at PE routers ports to their respective service. For example, in the case of VPLS service a SAP would specify physical identifiers (e.g. node, shelf, card, port) of the corresponding port and an service instance identifier (e.g. VLAN5) of the VPLS.

Services such as VPLS and VLL services provide the capability to securely communicate data packets among routers provisioned with the same service. Typically, thousands of such services are provisioned on a network, the data packet traffic that they each carry being kept separate from one another via special treatment provided at each router on which an instantiation of that service has been provisioned.

Each service has physical characteristics that in part define the service. These characteristics, also referred to a QoS parameters, include constant information rate (CIR), peak information rate (PIR), and maximum burst size (MBS) parameters and are often grouped into a policy for convenient provisioning of a service on a given router. Although policies and policy overrides are local to a router, it is desirable to define and use them on a network-wide basis for consistency, especially for a given service instance.

Still referring to FIG. 2, first and second filters, filter 1 and filter 2, are used to enforce QoS policy parameters on packets associated with their respective SAPs, i.e. SAP1 and SAP2. Packets of traffic flows that do not adhere to the established QoS policies parameters may be dropped, or marked for dropping, as shown.

Packets that egress from the first and second filters are then treated according to a respective application QoS policy, as shown by respective first and second classify functions, classify 1 and classify 2. For example, according to a first application QoS policy AQP1 the first classify function marks packets belonging to the VoIP/Video application traffic type for expedited forwarding (EF), packets from the file server application traffic type for assured forwarding (AF), and packets from the HIS and e-mail application traffic types for best effort (BE). Similarly, according to a second application QoS policy AQP2 the second classify function marks packets from the VoIP application traffic type for EF, packets from the HIS application traffic type for AF, and packets from the e-mail traffic type for BE. The classify functions also mark packets with an indication of the SAP to which they are associated, e.g. the first classify function, classify 1, marks packets as being associated with the first SAP, SAP1. The application QoS policies AQP1, AQP2 are configured on the router, router 1, by the SP 34 either directly or via the SAM 30.

It should be mentioned that the application traffic types can also be considered as corresponding to application groups, with one or more applications belonging to a respective application group. For example, the file server application traffic type can correspond to a file server application group, which includes applications such as file transfer protocol (FTP) and trivial FTP, as defined by IETF RFC 959 and IETF RFC 13507 respectively. Furthermore, packet format definitions specified by these IETF RFC standards can be used in protocol signature definitions for their respective applications, which signatures are used by DPI functions on the AA-ISA cards 22 to identify application traffic flows, as previously mentioned. Numerous application groups are possible. Even e-mail the application traffic type can include traffic from IMAP4, POP3, and SMTP mail applications as defined by IETF RFC 3501, RFC 1939, and RFC 2821, respectively.

After forwarding classification and marking is performed on the packets by the first and second classify functions, the packets are forwarded to queues. There is a separate queue for each type of forwarding treatment. For example there is an EF queue 38 for packets marked for EF treatment, an AF queue 40 for packets marked for AF treatment, and a BE queue 42 for packets marked for BE treatment. Each packet is forwarded to a respective queue in accordance with its given type of forwarding treatment, as determined and marked by the classify functions. For example, a particular packet 44 associated with the first SAP, SAP1 and belonging to the VoIP application traffic type is forwarded to the EF queue 38. Packets in the queues 38-42 are selected for routing or further processing in accordance with a scheduling function (not shown) that provides, at least in part, a prioritization consistent with the treatment associated with each queue.

An accounting policy 46, configured on the router, collects information (dotted lines) about packets egressing the queues 38-42 in accordance with the scheduling function. This information is passed to an application filter 48, configured on the router, according to the configuration of the accounting policy. For example, the accounting policy configuration specifies that information concerning packets associated with the first service access point SAP1 is to be forwarded to the application filter 48. This information is passed to a statistics database 50 of the router according to the configuration of the application filter 48. For example, the application filter configuration specifies information concerning packets of the VoIP application traffic type should be passed to the database 50. In this example, information concerning the particular packet 44, being associated with the first service access point SAP1 and the VoIP application traffic type, will be passed to the database 50. This information flow is shown as a dotted line in FIG. 2. The accounting policy 46 and application filter 48 are configured by the SP 34.

All or some of the aforementioned functions associated with the first router, router 1, and shown within the area defined by the dashed line in FIG. 2 may be implemented on the AA-ISA card 22.

The SAM 30 is configured by the SP 34 to collect information from the database 50 of the first router, router 1, and from statistics databases 52, 54 of other routers associated with the WAN 12. This configuration of the SAM 30 specifies which data is to be collected, e.g. based on Customer ID and Service ID, and how often.

The RAM 32 is configured by the SP 34 to retrieve the collected information from the SAM 30, aggregate the information and generate one or more reports from it. This configuration of the RAM 32 specifies how the aggregation is to be done, e.g. hourly, weekly, daily, and which type of reports are to be generated, e.g. by application type, by site, by volume, or come combination thereof, etc.

Figure 3:
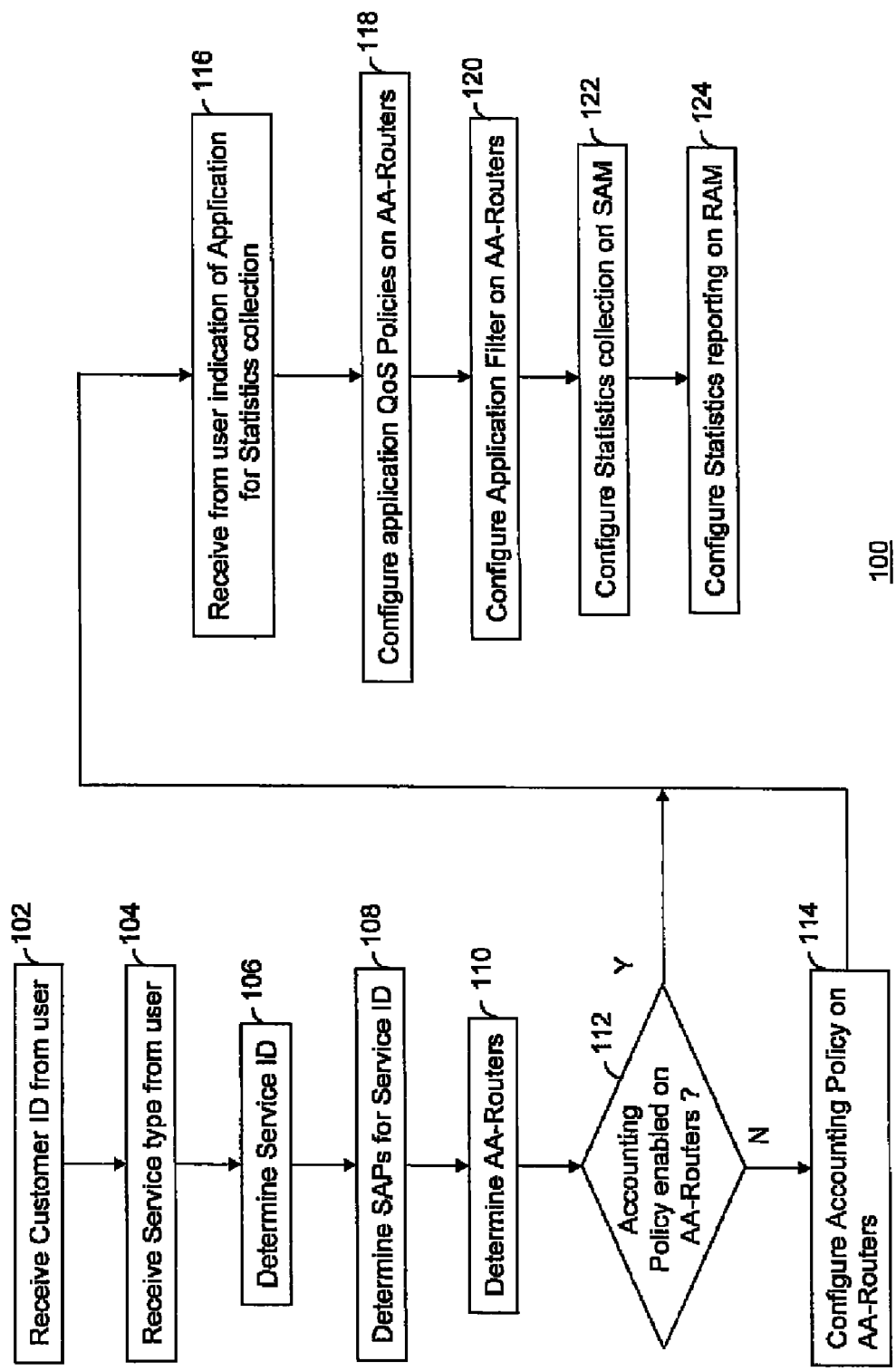
FIG. 3 illustrates a method of configuring an application management reporting service according to a second embodiment of the invention.

Referring to FIG. 3 and with additional reference to FIG. 1 and FIG. 2, a method 100 of configuring an application management reporting service will now be described. The method 100 starts by receiving 102 a customer identifier (Customer ID). Typically, the Customer ID would be received at the SP 34 and entered by a user. Typically the user would work for, or otherwise represent, the enterprise customer. For example the user could be a member of the enterprise's IT department, who has been tasked to track usage of a certain application by the enterprise's employees.

The service type is then received 104. Typically, the service type e.g. VLL, VPLS, and VPRN, would be received by the SP 34 and entered by the same user. The SP 34 then determines 106 an identifier of the service instance (Service ID) associated with the specified customer and service type. This is done by consulting the service database 33 in the SP 34 or accessible by the SP 34 that contains this information. The SP then determines 108 SAPs associated with the determined service instance. This determination is also made by consulting the service database 33 in the SP 34, and alternatively or additionally, could be made or confirmed using provisioning information stored on the SAM 30 or accessible via the SAM 30. Next the SP 34 determines application aware routers (AA-routers) 24 that have been provisioned with the determined SAPs. In some cases, not all routers of an enterprise's WAN will be AA-routers.

The determined AA-routers are then checked 112 to see whether or not an accounting policy 46 is enabled on them for the determined SAPs. If the accounting policy 46 is not enabled, the SP 34 enables the enables 114 it. Checking and enablement of the accounting policy 46 is done by the SP via the SAM 30. As mentioned previously, this and other interactions between the SAM 30 and SP 34 are done over the OSS Interface (SAM-O) 36 of the SAM 30.

The SP 34 then receives 116 an indication from the user of the application for which the application management reporting service is to be configured. The SP 34 then configures application QoS policies (e.g. AQP1) on the AA-routers if they are not already configured on them. To do this configuration the SP 34 consults its service database 33 to determine the appropriate type of treatment to be given to each application traffic type. The SP 34 then configures the application filter 48 on the determined AA-routers. This configuring of the application QoS policies and application filter 48 is done via the SAM 30 over the SAM-O interface 36 or in some cases may be done directly using router CLI commands.

The SP 34 then configures 122 the SAM 30 to collect traffic statistics concerning the application from router databases 50-54 of the determined AA-routers. This configuration includes specifying the collection frequency as well as information in the accounting policy 46 and application filter 48, such as SAP and application type. The collection frequency may be default for a given enterprise (Customer ID) and/or service type, or may be specified by the user or network operator.

The SP 34 then configures 124 the RAM 32 to collect the traffic statistics concerning the application from the SAM 30, aggregate the statistics, and generate one or more reports from them. The collection frequency, aggregation granularity and report may be default for a given enterprise (Customer ID) and/or service type, or may be specified by the user or network operator.

Numerous modifications, variations and adaptations may be made to the embodiment of the invention described above without departing from the scope of the invention, which is defined in the claims. For example, with regard to the method 100 described, the order that the steps are performed can be re-arranged. For instance, all the user input including Customer ID, service type, application of interest, and report type could be received before the SP 34 makes any determinations such as Service ID, SAPs and AA-routers involved. In some cases it would be possible for the user to provide the Service ID as input to the SP 34, so that the SP 34 can directly determine the SAPs involved from that input. In some cases the user could provide customer identification information, such as customer name, and the application of interest. The SP 34 could, from only that information, determine other information such as SAPs involved and use default selections for other configuration information such as AQPs, application filters, SAM 30 statistics collection options, and RAM 32 reporting options. Furthermore, the steps of configuring the application QoS policies and application filter on the AA-routers, and configuring statistics collection and reporting on the SAM 30 and RAM 32, respectively, could be done in any order.

What is claimed is:

1. A method of configuring an application management reporting service for a networked application provided over a packet switching network, comprising the steps of:
   receiving input identifying said application and a customer of said application; and
   executing automatically instructions stored on a computer readable media, the instructions when executed causing a sequence of steps to be performed, the sequence comprising the steps of:
      determining, from the input, a service access point to be affected by configuration of said service;
      determining a router of the packet switching network that is configured with said service access point;
      configuring the router with an application filter corresponding to said application and said service access point, wherein the application filter selectively collects information related to said application; and
      configuring a reporting entity to retrieve statistics collected by the application filter related to said application.

2. The method of claim 1, wherein the step of configuring the router comprises enabling, on the router, an accounting policy corresponding to said service access point when said accounting policy is not already enabled.

3. The method of claim 1, wherein the step of configuring the router comprises configuring, on the router, an application quality of service policy on the router when said quality of service policy is not already configured.

4. The method of claim 1, wherein the step of configuring the reporting entity comprises configuring a management entity to collect said statistics from the application filter and to make said statistics available for retrieval by the reporting entity.

5. The method of claim 1, wherein the step of configuring the reporting entity comprises specifying one or more of: a report format, a retrieval interval, and a statistics aggregation granularity.

6. The method of claim 1, wherein the step of determining the service access point determining one or more of: a service type and a service instance identifier.

7. A system for configuring an application management reporting service for a networked application provided over a packet switching network, comprising:
   a service application stored thereon;
   means for communicatively coupling to a management entity of the packet switching network via an operations support system interface; and
   a service database for storing information related to said networked application and a customer of the networked application,
   wherein the service application comprises instructions stored on computer readable media to be executed by the system to cause a sequence of actions to be performed in cooperation with the management entity, the actions comprising:
      receiving input identifying said networked application and the customer of said networked application;
      determining, from the input, a service access point to be affected by configuration of said service;
      determining a router of the packet switching network that is configured with said service access point;
      configuring the router with an application filter corresponding to said networked application and said service access point, wherein the application filter selectively collects information related to said networked application; and
      configuring a reporting entity to retrieve statistics collected by the application filter related to said networked application.

8. The system of claim 7, wherein the service application further comprises instructions for enabling, on the router, an accounting policy corresponding to said service access point when said accounting policy is not already enabled.

9. The system of claim 7, wherein the service application further comprises instructions for configuring, on the router, an application quality of service policy on the router when said quality of service policy is not already configured.

10. The system of claim 7, wherein the service application further comprises instructions for configuring a management entity to collect said statistics from the application filter and to make said statistics available for retrieval by the reporting entity.

11. The system of claim 7, wherein the service application further comprises instructions for specifying one or more of: a report format, a retrieval interval, and a statistics aggregation granularity, when configuring the reporting entity.

12. The system of claim 7, wherein the service application further comprises instructions for determining one or more of: a service type and a service instance identifier, when determining the service access point.

13. The method of claim 1, wherein the router is an application aware router configured to provide stateful application traffic flow inspection for Layer 2 and Layer 3 of virtual private network (VPN) services.

14. The method of claim 1, wherein the input further identifies a service type provided by the packet switching network.

15. The method of claim 3, wherein the application quality of service policy configures the router to classify traffic for said application into one of a plurality of queues.

16. The system of claim 7, wherein the router is an application aware router configured to provide stateful application traffic flow inspection for Layer 2 and Layer 3 of virtual private network (VPN) services.

17. The system of claim 7, wherein the input further identifies a service type provided by the packet switching network.

18. The system of claim 9, wherein the application quality of service policy configures the router to classify traffic for said networked application into one of a plurality of queues.

* * * * *